United States Patent [19]

Melugin

[11] 3,994,543
[45] Nov. 30, 1976

[54] SHAFT LOCKING DEVICE

[75] Inventor: Simeon A. Melugin, Capistrano Beach, Calif.

[73] Assignee: Lamcor Incorporated, Anaheim, Calif.

[22] Filed: Feb. 28, 1975

[21] Appl. No.: 553,985

[52] U.S. Cl. .................................. 308/24; 64/4; 292/302; 403/26; 403/327
[51] Int. Cl.² ................ F16B 21/00; F16C 32/00; F16C 35/00; F16J 1/18
[58] Field of Search ............... 64/4,5; 292/302; 308/24; 403/26, 327

[56] References Cited
UNITED STATES PATENTS

| 703,667 | 7/1902 | Owen | 308/24 |
|---|---|---|---|
| 718,268 | 1/1903 | Meats | 308/24 |
| 983,347 | 2/1911 | Buschor | 308/24 X |
| 1,148,741 | 8/1915 | Beede | 308/24 |
| 1,248,259 | 11/1917 | Brown | 308/51 |
| 1,255,443 | 2/1918 | Lea | 308/24 X |
| 1,379,818 | 5/1921 | Hinnekens | 308/24 |
| 1,502,218 | 7/1924 | Van Hook | 308/24 |
| 1,628,709 | 5/1927 | Dawson | 308/24 |
| 2,514,152 | 7/1950 | Darash | 308/24 X |
| 3,035,862 | 5/1962 | Phelps | 292/302 |

Primary Examiner—Robert J. Spar
Assistant Examiner—Howard Beltran
Attorney, Agent, or Firm—Lyon & Lyon

[57] ABSTRACT

A locking device having a partial bearing surface formed by a shaft cradle. A restraining enclosure is formed by the shaft cradle and a slidably reciprocating detent having a recess therein, the detent being urged to form said restraining enclosure by a tension means.

4 Claims, 2 Drawing Figures

SHAFT LOCKING DEVICE

BACKGROUND OF THE INVENTION

1. Field of the Invention

The present invention relates to a locking device which may be utilized to restrain a rotating shaft of journal.

2. Description of the Prior Art

Various devices have been previously utilized to restrain a rotating shaft. Shafts or journals utilized in looms or about which electrical cable and wire are wound or unwound are typical of the applications for such locking devices.

Generally, when material is wound onto a shaft, no material is wound onto the ends of the shaft which are left exposed. Thus the shaft may be restrained about the two shaft ends. In other applications more than one material may be wound onto a shaft, the materials being spaced apart along the shaft length. In this case the shaft or journal may be restrained at the exposed portion of the shaft between the wound materials in addition to the ends of the shaft. While it is imperative that the shaft or journal be securely restrained, the shaft must also be allowed to freely rotate and be easily removed from the restraining device when it is desired to replace the shaft.

An exemplar of a typical locking mechanism is the device disclosed in U.S. Pat. No. 1,502,218 issued to Van Hook. The Van Hook locking device utilizes a rather complicated mechanism whereby spring biased bolts are withdrawn from a engaging relationship with a shaft by means of rotating a crank, thus allowing the removal of the shaft from a recess or cradle. Such devices are expensive due to their complexity, and are also difficult to operate and maintain. Furthermore, such devices do not provide a low friction bearing surface upon which the shaft may turn.

An object of this invention is to provide an improved device for locking a shaft or the like. Other objectives will be apparent upon a reading of the entire specification, drawing and claims.

SUMMARY OF THE INVENTION

In accordance with this invention, a locking or restraining device for a rotating shaft or journal is provided so as to laterally and longitudinally restrain the shaft or journal. The locking device has at least one detent having a recess therein and at least one shaft cradle cooperating with the detent recess so as to form a restraining enclosure. The detent is urged to maintain the closure for the shaft with the shaft cradle by a tension means coupled to the detent. The detent is further provided with at least one slot for slidably reciprocating the detent in opposition to the tension means, whereby upon the application of a force having a component parallel to the detent slot, the detent may be placed in the "open" position. In this open position the detent recess and shaft cradle no longer form a restraint about the shaft thus allowing the shaft or journal to be removed from the cradle. Upon the release of such a force the tension means restores the detent to the closed position, wherein detent recess resumes the formation of the restraining enclsosure with the shaft cradle. The shaft cradle is provided with one or more roller members forming a partial bearing surface which allow the shaft or journal to rotate while restrained within the enclosure provided by the detent recess and shaft cradle.

DESCRIPTION OF PREFERRED EMBODIMENTS

Figure 1:
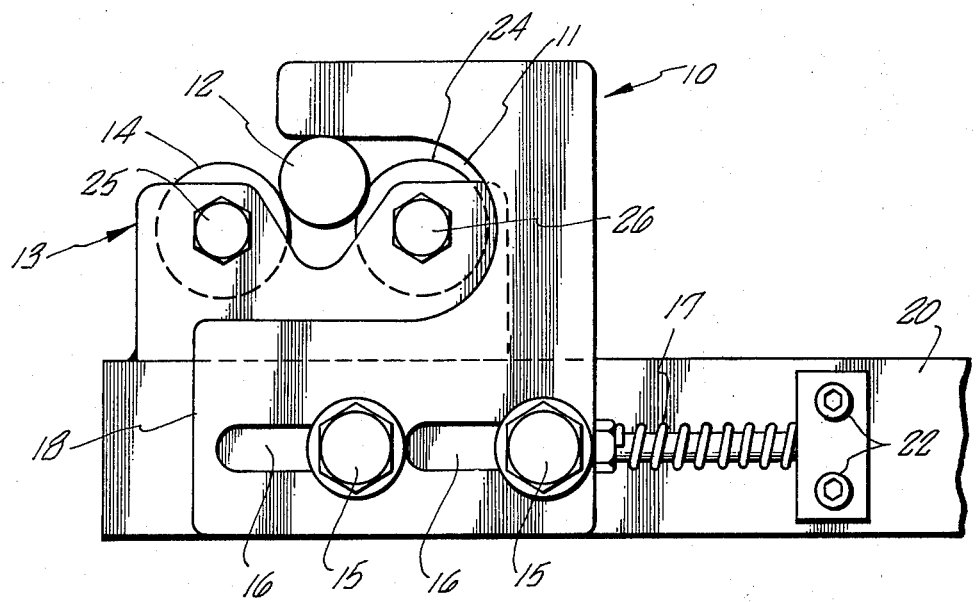
FIG. 1 is a side view illustrating the shaft lock of the present invention.

Referring now to FIG. 1, a detent generally referred to as 10 is depicted having a semicircular recess 11. The detent 10 may be further provided with two slots 16 within which bolts 15 are positioned, thereby allowing for the mounting of the detent 10 to a frame 20. A tension means 17, which may be a spring in a preferred embodiment may be coennected to the detent 10 and may be secured to the frame 20 as by means of a bracket 21 secured to the frame 20 by bolts 22, so as to urge the detent 10 forwardly into a "closed" position which will be described subsequently in greater detail.

A shaft cradle 13 may be provided with two roller members 14 and 24, the roller members 12 and 24 forming a partial shaft bearing surface. The recess 11 of the detent 10 and the roller members 12 and 24 of the shaft cradle 13 form an enclosure which laterally and longitudinally restrains a shaft or a journal 12. The roller member 14 may rotate about a shaft 25, the roller member 24 being allowed to rotate about a shaft 26. Thus as the shaft or journal 12 is rotated, the roller members 14 and 24 also rotate thereby achieving a low friction bearing surface.

When it is desired to remove the shaft 12 or inset another shaft, a force may be applied to the detent 10, at for example a front face 18, the force having a component which opposes the tension means 17. Such a force causes the detent 10 to move rearwardly thus moving the detent to a "open" position whereby shaft 12 may be easily removed from the shaft cradle 13.

Figure 2:
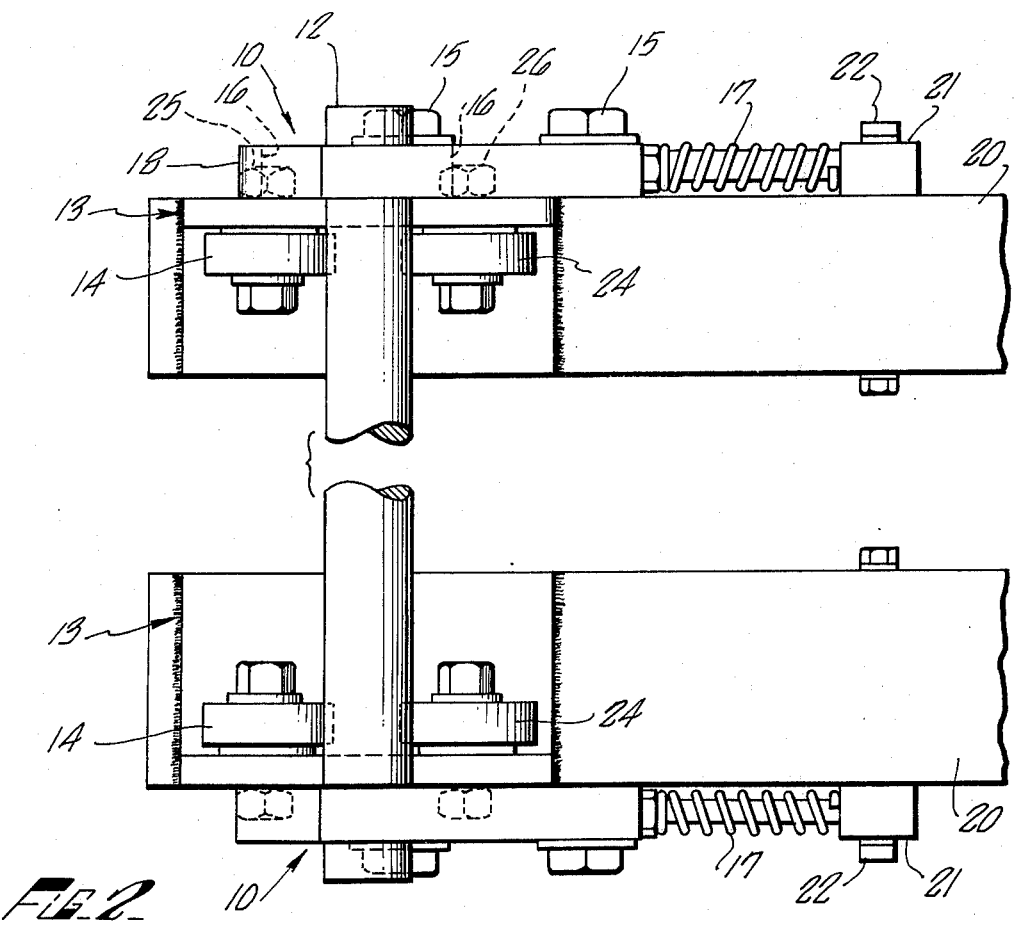
FIG. 2 is a top view illustrating the shaft lock of the present invention.

In a preferred embodiment as shown in FIG. 2, two shaft cradles 13 with cooperating detents 10 are utilized to restrain a shaft 12. Additionally, in a preferred embodiment, the centerline of the tension or spring means 17 is substantially parallel to the centerline of the slots 16 in the detent 10. The cradle 13 may be located directly below the detent 10, or the detent 10 may be located nearer, or further from, the shaft end than is the shaft cradle 13. Such a journal or shaft lock provides a relatively simple and inexpensive device for insuring the securing of a rotatable shaft, while achieving such restraint with a minimum of frictional losses. Such a shaft lock may be easily reciprocated into the open position either manually or automatically thus allowing for the removal of insertion of a shaft 12.

Although preferred embodiments of the invention have been described, it will be readily apparent that alteration and modification may be reserted to without departing from the scope of the invention, and such alterations and modifications are intended to be included within the scope of the appended claims.

I claim:

1. A shaft lock comprising:
    at least one slidably reciprocatable detent having a recess therein and adapted to be reciprocated by the insertion of a shaft within said shaft lock recess;
    at least one shaft cradle cooperating with said detent recess so as to form a shaft lock enclosure adapted for the restraint of a rotatable shaft said shaft cradle being provided by a pair of roller members whose axis of rotation is below the center of said shaft lock enclosure; and tension means coupled to said detent which urges said detent to form said shaft lock enclosure with said shaft cradle.

2. The shaft lock claimed in claim 1 wherein said detent is provided with at least one slot for slidably reciprocating said detent in opposition to said tension means.

3. The shaft lock claimed in claim 1 wherein said shaft cradle has the exterior circumferential surface of said roller members forming a partial bearing surface for a rotatable shaft.

4. A journal restraint comprising:

first and second detents having a shaft lock recess therein and being further provided with at least one slot, said slot allowing said detents to be slidably reciprocated by the application of a force having a component parallel to the centerline of said slot, said force being provided by the insertion of a shaft within said shaft lock recess;

first and second shaft cradles cooperating with said shaft lock recess of said first and second detents respectively so as to form first and second journal lateral and longitudinal restraining enclosures having substantially the same centerline, said shaft cradles being provided with a pair of roller members which form a partial bearing surface for said journal the axes of rotation of said roller members being lower than said journal enclosures; and a tension means positioned between said first and second detents and a fixed frame, said tension means having a centerline substantially parallel to the centerline of said slots, said tension means urging said first and second detents to form said first and second journal restraining enclosures with said first and second shaft cradle roller members.

* * * * *